United States Patent
Byen et al.

(10) Patent No.: US 12,278,568 B2
(45) Date of Patent: Apr. 15, 2025

(54) POWER FACILITY FOR REMOTE CONTROL

(71) Applicant: HYOSUNG CORPORATION, Seoul (KR)

(72) Inventors: Byeng Joo Byen, Suwon-si (KR); Byung Hwan Jeong, Gwacheon-si (KR)

(73) Assignee: HYOSUNG CORPORATION, Seoul (KR)

(*) Notice: Subject to any disclaimer, the term of this patent is extended or adjusted under 35 U.S.C. 154(b) by 511 days.

(21) Appl. No.: 17/623,153

(22) PCT Filed: Jun. 14, 2021

(86) PCT No.: PCT/KR2021/007407
§ 371 (c)(1),
(2) Date: Dec. 27, 2021

(87) PCT Pub. No.: WO2021/256809
PCT Pub. Date: Dec. 23, 2021

(65) Prior Publication Data
US 2022/0271678 A1    Aug. 25, 2022

(30) Foreign Application Priority Data
Jun. 18, 2020 (KR) .......................... 10-2020-0074340

(51) Int. Cl.
*H02M 3/335* (2006.01)
*H02M 1/00* (2006.01)

(52) U.S. Cl.
CPC ..... *H02M 3/33576* (2013.01); *H02M 1/0003* (2021.05)

(58) Field of Classification Search
CPC ............ H02M 3/22; H02M 1/08; H02M 1/36; H02M 3/24; H02M 3/325; H02M 3/335;
(Continued)

(56) References Cited

U.S. PATENT DOCUMENTS 5,349,523 A * 9/1994 Inou .................. H02M 3/33515
363/21.05
7,050,434 B2 * 5/2006 Tamura .................. H04L 61/00
370/392

(Continued)

FOREIGN PATENT DOCUMENTS

JP     2004-022231 A   1/2004
KR    10-1999-0024198 A   3/1999
(Continued)

*Primary Examiner* — Jeffrey A Gblende
(74) *Attorney, Agent, or Firm* — NKL LAW; Jae Youn Kim (57) ABSTRACT

A power facility for remote control includes: an analog sensing value reception unit that collects an internal analog sensing value of the power facility; a digital conversion unit that converts the analog sensing value into digital information; and a communication unit that transmits the digital information to an external remote control device by using one optical path. Therefore, by allowing a plurality of analog sensing values from the power facility to be transmitted to the remote control device by using one optical path, transmission efficiency can be increased, and by converting a plurality of analog sensing values of the power facility into digital information and transmitting the digital information with an asynchronous frame, the plurality of analog sensing values can be efficiently transmitted through one optical path without a separate synchronous signal.

6 Claims, 4 Drawing Sheets

(58) Field of Classification Search
CPC ...... H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; Y02B 70/1491

See application file for complete search history.

(56) References Cited

U.S. PATENT DOCUMENTS

| | | | | |
|---|---|---|---|---|
| 10,193,452 | B2* | 1/2019 | Sheng | H02M 3/33576 |
| 10,390,404 | B2* | 8/2019 | Luccato | H02M 3/33523 |
| 2013/0328520 | A1* | 12/2013 | Chen | H02J 7/00 |
| | | | | 320/107 |
| 2017/0149339 | A1* | 5/2017 | Kawashima | H02M 3/33507 |

FOREIGN PATENT DOCUMENTS

| | | |
|---|---|---|
| KR | 10-2005-0024780 A | 3/2005 |
| KR | 10-1041223 B1 | 6/2011 |
| KR | 10-2018-0044036 A | 5/2018 |

* cited by examiner

POWER FACILITY FOR REMOTE CONTROL

TECHNICAL FIELD

The present invention relates to a power facility for remote control, and more particularly, to transmit an analog value for monitoring inside the power facility to the remote controller by using one optical path. That is, the present invention relates to a power facility for remote control that can perform asynchronous transmission with one optical path by converting a plurality of analog values in the power facility into digital values.

BACKGROUND ART

In order to construct a smart power grid through efficient power management of power facilities, industrial facilities, and private facilities, smart grid technology that combines IT technology with the existing power grid emerges.

The smart grid environment configures a hybrid network in which various devices are mixed and wired and wireless networks are combined. For example, in a smart grid communication network construction method, a broadband wireless communication (Wimax) is used as a trunk network, and a high-speed power line communication (PLC) is used as a subscriber network, so that efficiency of construction of a smart grid (integrated meter reading, energy management, electric vehicle, solar facility monitoring, or the like) of a power company in addition to the Internet/phone service is increased.

As an example, Korean Patent Application Publication No. 10-1998-0084286 discloses a structure of an automatic voltage adjustment device of a main transformer of a power transmission/transformation facility in which an optical element perform conversion into an electrical output, and an optical insulation unit that drives an electric circuit on the other side is connected to a control unit.

However, an efficient optical communication method using a plurality of optical paths has not been proposed.

Among power facilities, a semiconductor transformer (SST; Solid State Transformer) denotes a device that is obtained by replacing an existing main transformer operating at 60 Hz with a high-frequency transformer operating at a high frequency and converts a low-frequency high-voltage input power into high-frequency voltage/current by using semiconductor element and converts the high-frequency voltage/current into a low-voltage DC through a high-frequency transformer and is also called an intelligent transformer.

Since the high frequency transformer has a high operating frequency, power can be transmitted even with a small inductance, and the size of the transformer can be drastically reduced. However, a large number of optical paths are used to transmit analog information to a remote controller for monitoring the inside of the high-frequency transformer, so that the High-frequency transformers have a disadvantage in that transmission efficiency is lowered.

In particular, in the case of a semiconductor transformer, with respect to an analog value of which monitoring is required or intended, such as input/output voltage and current value of the semiconductor transformer, a charging voltage value of a capacitor constituting an element inside the semiconductor transformer, and a resistance value of a negative thermal coupler (NTC) inside a board that drives a high-frequency transistor, the analog value is transmitted to the remote controller by using a voltage frequency converter (VFC), and at this time, each optical path is used for each analog value.

Accordingly, there is a problem in that the transmission efficiency is decreased because N optical paths are required to transmit the N analog values.

SUMMARY OF INVENTION

Technical Problem

An object of the present invention is to provide a power facility for remote control that increases transmission efficiency by allowing a plurality of analog sensing values from the power facility to be transmitted to the remote control device by using one optical path.

Another aspect of the present invention is to provide a power facility for remote control capable of converting a plurality of analog sensing values of the power facility into a digital value to form an asynchronous frame, and therefore, efficiently transmitting the digital information through one optical path without a separate synchronous signal.

Solution to Problem

A power facility for remote control according to an embodiment of the present invention includes: an analog sensing value reception unit that collects an internal analog sensing value of the power facility; a digital conversion unit that converts the analog sensing value into digital information; and a communication unit that transmits the digital information to an external remote control device by using one optical path.

Herein, the analog sensing value may be at least one of an internal voltage value, an internal current value, and an internal resistance value of the power facility.

In this case, the communication unit may transmit the digital information with an asynchronous frame.

In addition, the asynchronous frame includes a preamble portion providing synchronous information; a control operation portion providing control information; a data portion providing the digital information; and a checksum portion checking an error during transmission of the frame.

On the other hand, a semiconductor transformer for remote control (Solid State Transformer) according to another embodiment of the present invention includes: an analog sensing value reception unit that collects an internal analog sensing value of the semiconductor transformer; a digital conversion unit that converts the analog sensing value into digital information; and a communication unit that transmits the digital information to an external remote control device by using one optical path.

Herein, the analog sensing value may be at least one of an internal voltage value, an internal current value, and an internal resistance value of the power facility.

In addition, the communication unit may transmit the digital information with an asynchronous frame.

In addition, the asynchronous frame includes: a preamble portion providing synchronous information; a control operation portion providing control information; a data portion providing the digital information; and a checksum portion checking an error during transmission of the frame.

On the other hand, a semiconductor transformer for remote control (Solid State Transformer) according to still another embodiment of the present invention includes: a high-voltage unit that converts an input low-frequency high-voltage AC into a high-frequency high-voltage AC voltage;

a step-down unit that converts the high-frequency high-voltage AC voltage into a high-frequency low-voltage AC voltage by stepping down the high-frequency high-voltage AC voltage; a low-voltage unit that rectifies the high-frequency low-voltage AC voltage, charges the rectified low-voltage DC voltage, and outputs the rectified low-voltage DC voltage; an analog sensing value reception unit that collects an internal analog sensing value of the semiconductor transformer; a digital conversion unit that converts the analog sensing value into digital information; and a communication unit that transmits the digital information to an external remote control device by using one optical path.

Herein, the analog sensing value may be at least one of an internal voltage value, an internal current value, and an internal resistance value of the power facility.

In addition, the communication unit may transmit the digital information with an asynchronous frame.

In addition, the asynchronous frame includes: a preamble portion for providing synchronous information; a control operation portion providing control information; a data portion providing the digital information; and a checksum portion checking an error during transmission of the frame.

In addition, the high-voltage unit includes: a high-voltage storage unit that converts the input low-frequency high-voltage AC into a high-voltage DC to charge the high-voltage DC; an AC conversion unit that converts an output of the high-voltage storage unit into a high-frequency high-voltage AC; a high-voltage driving unit that drives a transistor inside the high-voltage storage unit and the AC conversion unit; and a high-voltage communication unit that receives an analog sensing value of at least one of the voltage values, the current values, and the resistance values of the high-voltage storage unit and the high-voltage driving unit, converts the analog sensing value into the digital information, and performs the communication with the remote control device by using the digital information.

In addition, the low-voltage unit includes: a low-voltage storage unit that rectifies the input high-frequency low-voltage AC as an output of the step-down unit and charges and outputs a low-voltage DC; a low-voltage driving unit that drives a transistor inside the low-voltage storage unit; and a low-voltage communication unit that receives an analog sensing value of at least one of an internal voltage value, an internal current value, and an internal resistance value of the low-voltage storage unit and the low-voltage driving unit, converts the analog sensing value into the digital information, and communicates with the remote control device.

Herein, the voltage value may include an input voltage value of the high-voltage storage unit and a charging voltage value of a capacitor inside the high-voltage storage unit; the current value may include an input current value of the high-voltage storage unit; and the resistance value is, may include a resistance value of a negative thermal coupler (NTC) inside the high-voltage driving unit.

In addition, the voltage value may include an output voltage value of the low-voltage storage unit and a charging voltage value of a capacitor inside the low-voltage storage unit; the current value may include an output current value of the low-voltage storage unit; and the resistance value may include a resistance value of a negative thermal coupler (NTC) inside the low-voltage driving unit.

Advantageous Effects of Invention

The power facility for remote control according to the present invention has an advantage of increasing transmission efficiency by allowing a plurality of analog sensing values of the power facility to be transmitted to the remote control device by using one optical path.

In addition, the power facility for remote control according to the present invention has an advantage in that, by converting a plurality of analog sensing values of the power facility into digital information and transmitting the digital information with an asynchronous frame, the plurality of analog sensing values can be efficiently transmitted through one optical path without a separate synchronous signal.

DESCRIPTION OF EMBODIMENTS

Detailed embodiments for carrying out the present invention will be described with reference to the accompanying drawings.

The present invention can be variously changed and can have various embodiments, and thus, specific embodiments are illustrated in the drawings and described in detail in the detailed description. This is not intended to limit the present invention to a specific embodiment, and it can be understood to include all modifications, equivalents, and substitutes included within the spirit and scope of the invention.

Hereinafter, a power facility for remote control according to the present invention will be described in detail with reference to the accompanying drawings.

Figure 1:
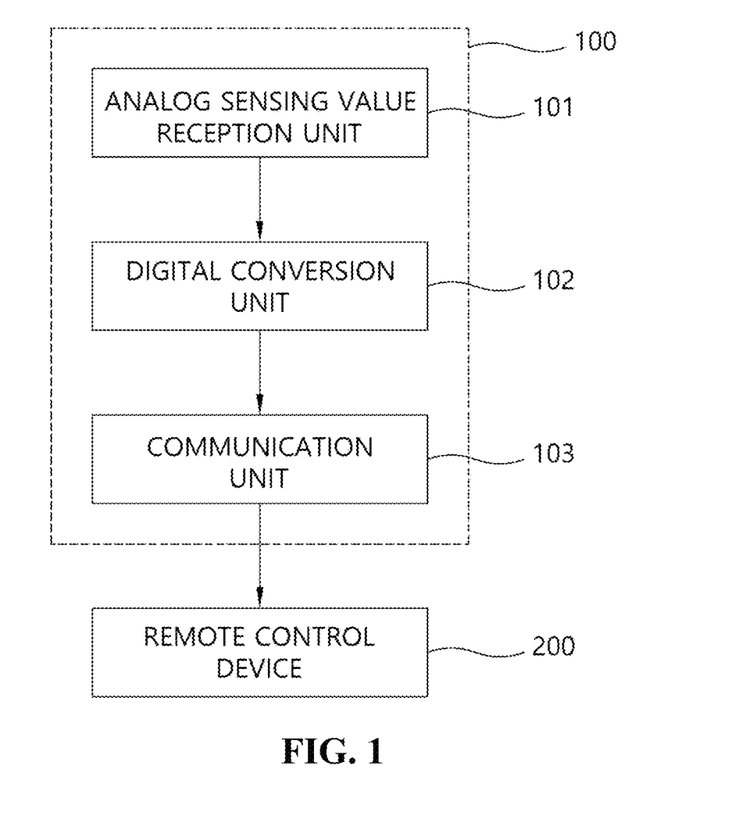
FIG. 1 is a block diagram illustrating a power facility for remote control according to an embodiment of the present invention.
Figure 2:
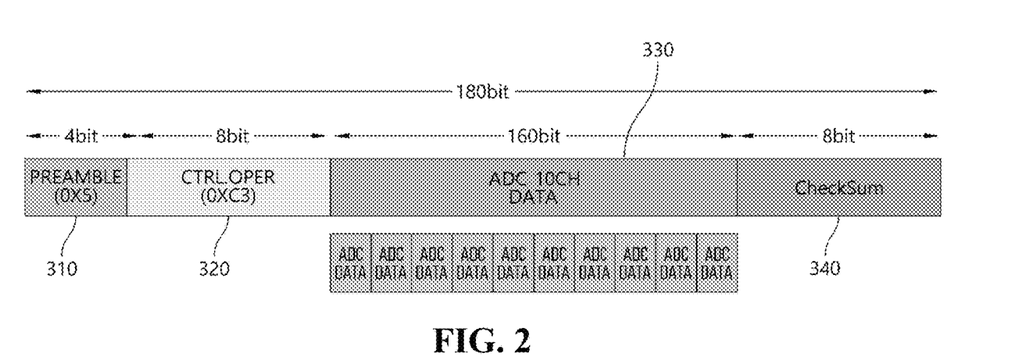
FIG. 2 is a diagram illustrating an example of an asynchronous frame used when a communication unit of FIG. 1 transmits digital information to an external remote control device.
Figure 3:
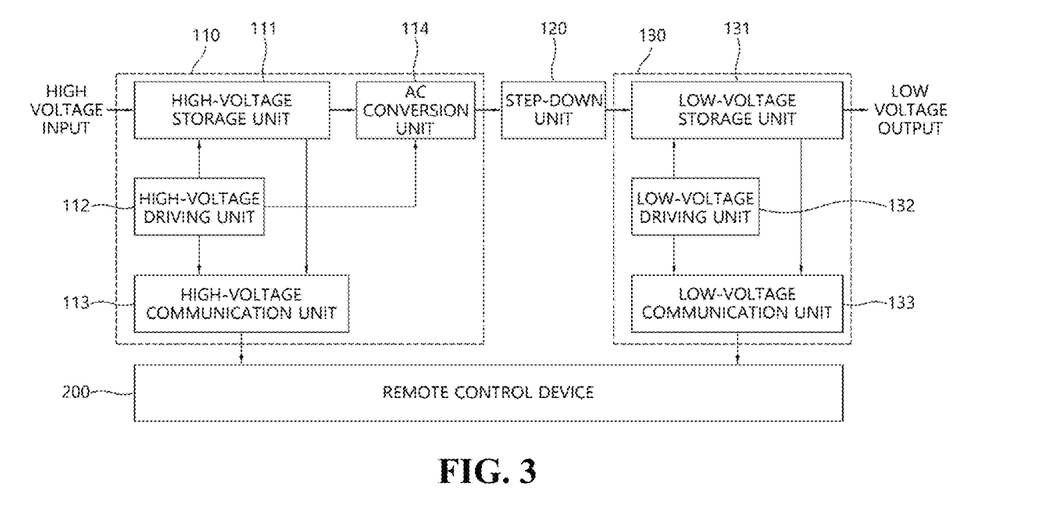
FIG. 3 is a block configuration diagram schematically illustrating a configuration of the power facility in a case where the power facility of FIG. 1 is a semiconductor transformer (SST).
Figure 4:
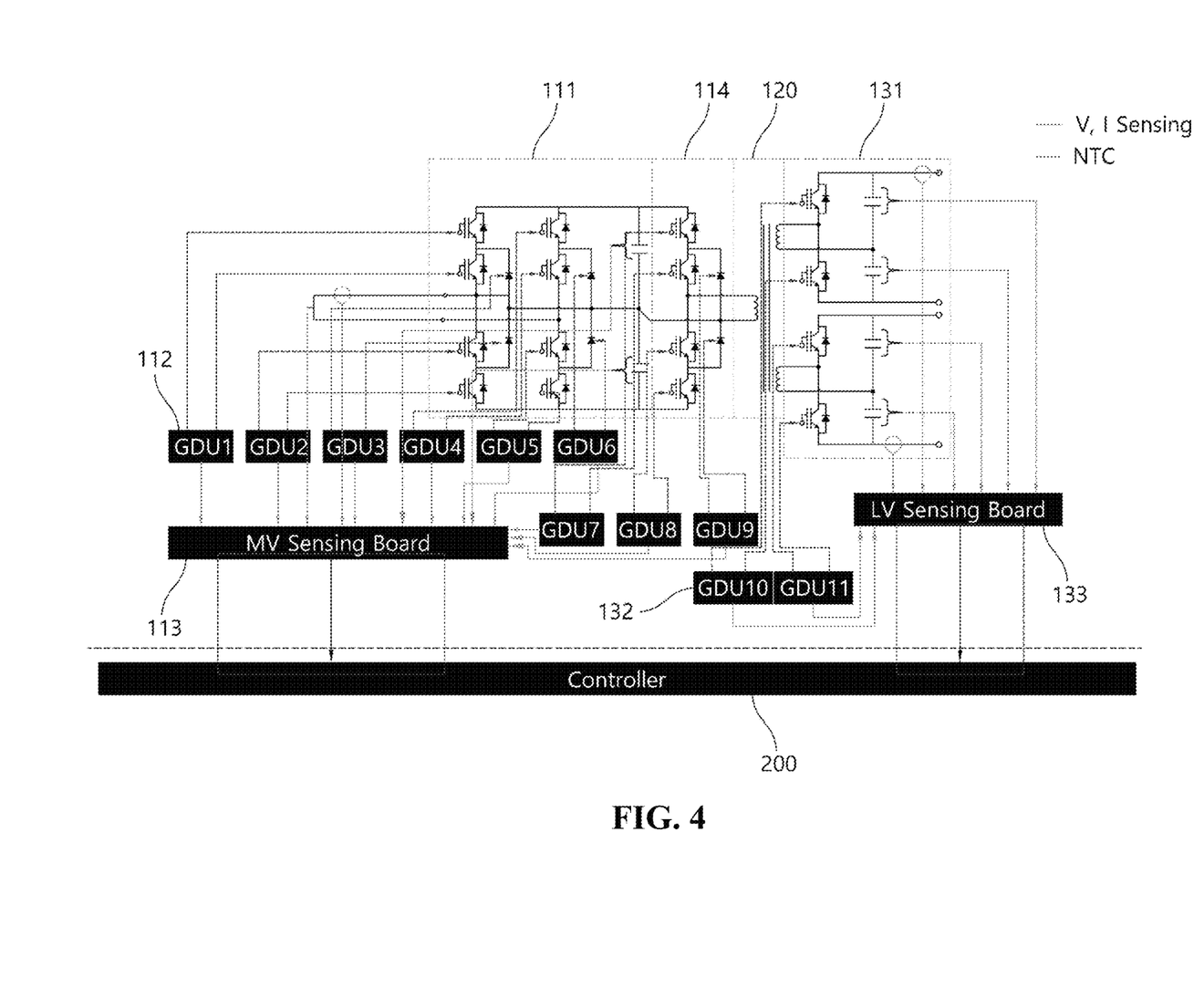
FIG. 4 is a diagram illustrating an example in which the block configuration diagram of the semiconductor transformer (SST) of FIG. 3 is implemented as a circuit.

FIG. 1 is a block diagram illustrating a power facility for remote control according to an embodiment of the present invention, and FIGS. 2 to 4 are detailed diagrams and block configuration diagrams illustrating FIG. 1 in detail.

Hereinafter, the power facility for remote control according to an embodiment of the present invention will be described in detail with reference to FIGS. 1 to 4.

First, referring to FIG. 1, a power facility 100 for remote control according to an embodiment of the present invention includes an analog sensing value reception unit 101 that collects an internal analog sensing value of the power facility, a digital conversion unit 102 that converts the analog sensing value into digital information, and a communication unit 103 that transmits the digital information to an external remote control device 200 by using one optical path.

Herein, the analog sensing value may be an internal voltage value, an internal current value, an internal resistance value, or the like of the power facility. For example, the internal analog sensing value of the power facility may be input/output internal voltage value and internal current value of the power facility, a charging voltage value of a capacitor constituting an element inside a semiconductor transformer, a resistance value of a negative thermal coupler (NTC) inside a board driving a high frequency transistor, or the like.

The communication unit 103 transmits the digital information with an asynchronous frame by using one optical path, and the asynchronous frame used at this time will be described in detail later in FIG. 2.

That is, the power facility 100 for remote control according to the present invention allows the analog sensing value reception unit 101 to collect an analog sensing value such as an input/output internal voltage value and internal current value of the power facility, a charging voltage value of a capacitor constituting an element inside the semiconductor transformer, and a resistance values of a negative thermal coupler inside a board for driving a high-frequency transistor and, during transmission of the analog sensing value to the remote control device 200, allows the digital conversion unit 102 to convert the analog sensing value into one piece of digital information without directly transmitting the analog sensing value by using a voltage frequency converter (VFC).

After that, the corresponding digital information is transmitted to the remote control device 200 by using one optical path with an asynchronous frame through the communication unit 103. That is, the communication unit 103 has the advantage in that, since the asynchronous frame that can be demodulated without an synchronous signal in the remote control device 200 is used during transmission of the digital signal, there is no need to transmit the synchronous signal of the digital signal simultaneously, and thus, the digital signal can be transmitted through one optical path.

FIG. 2 is a diagram illustrating an example of the asynchronous frame used when the communication unit 103 of FIG. 1 transmits the digital information to the external remote control device 200.

As can be seen in FIG. 2, the asynchronous frame used in the present invention includes a preamble portion 310 that provides synchronous information, a control operation portion 320 that provides control information, a data portion 330 that provides digital information, and a checksum portion 340 that checks an error during frame transmission.

Herein, the preamble portion 310 may be configured with a digital signal that is repeated several times with the same signal to restore a clock signal of the remote control device 200. Accordingly, an internal clock of the remote control device 200 is synchronized with that of the power facility by the preamble portion 310, so that the control operation portion 320, the data portion 330, and the checksum portion 340 can be received normally.

In addition, different types of the data portion 330 may be used according to the type of control operation defined in the control operation portion 320, and the data portion 330 may include digitally converted voltage values, current values, resistance values, or the like.

The checksum portion 340 may use a checksum obtained by summing all data values of the control operation portion 320 and the data portion 330 among all the frames transmitted from the power facility 100 to the remote control device 200.

On the other hand, in the remote control device 200, in a case where the checksum for the control operation portion 320 and the data portion 330 is the same as the checksum transmitted to the checksum portion 340, it may be determined that no error occurs during transmission between the power facility 100 and the remote control device 200, and in a case where the checksum is not the same, it may be determined that an error occurs during transmission between the power facility 100 and the remote control device 200. Therefore, reliable data transmission can be performed.

FIG. 3 is a block configuration diagram schematically illustrating the configuration of the power facility in a case where the power facility of FIG. 1 is a semiconductor transformer (SST).

As can be seen from FIG. 3, the semiconductor transformer (Solid State Transformer) includes a high-voltage unit 110 that converts an input low-frequency high-voltage AC into a high-frequency high-voltage AC voltage, a step-down unit 120 that steps down the high-frequency high-voltage AC voltage and converts the high-frequency high-voltage AC voltage to a high-frequency low-voltage AC voltage, and a low-voltage unit 130 that rectifies the high-frequency low-voltage AC voltage, performs charging with a low-voltage DC, and outputs the low-voltage DC, so that the low-frequency high-voltage AC voltage can be supplied as a low-voltage DC voltage.

The high-voltage unit 110 includes a high-voltage storage unit 111 that converts an input low-frequency high-voltage AC into a high-voltage DC and performs charging with the high-voltage DC, an AC conversion unit 114 that converts the output of the high-voltage storage unit 111 into a high-frequency high-voltage AC, a high-voltage driving unit 112 that drives a transistor inside the high-voltage storage unit 111 and the AC conversion unit 114, and a high-voltage communication unit 113 that receives analog sensing values such as internal voltage values, internal current values, and internal resistance values of the high-voltage storage unit 111 and the high-voltage driving unit 112, converts the analog sensing value into digital information to communicate with the remote control device 200.

The low-voltage unit 130 includes the low-voltage storage unit 131 that rectifies the high-frequency low-voltage AC as an output of the step-down unit 120 and outputs the charged low-voltage DC, the low-voltage driving unit 132 that drives the transistor inside the low-voltage storage unit 131, and the low-voltage communication unit 133 that receives analog sensing values such as internal voltage values, internal current values, and internal resistance values of the low-voltage storage unit 131 and the low-voltage driving unit 132, converts the analog sensing value into digital information to communicate with the remote control device 200.

On the other hand, the high-voltage unit 110 is configured with a high-voltage storage unit 111, an AC conversion unit 114, a high-voltage driving unit 112, and a high voltage communication unit 113; the low-voltage unit 130 is configured with a low-voltage storage unit 131, a low-voltage driving unit 132, and a low-voltage communication unit 133; and the high-voltage communication unit 113 and the low-voltage communication unit 133 serve to transmit internal current values, internal voltage values, resistance values, or the like of the high-voltage unit 110 and the low-voltage unit 130 to the remote control device (200).

At this time, the high-voltage communication unit 113 and the low-voltage communication unit 133 may transmit a single digital signal converted without VFC for the analog sensing values of the current values, the voltage values, the resistance values, or the like and may transmit a digital signal through one optical path by transmitting a compressed digital signal.

FIG. 4 is a diagram illustrating an example in which the block configuration diagram of the semiconductor transformer (SST) of FIG. 3 is implemented as a circuit.

As can be seen in FIG. 4, the voltage value in the semiconductor transformer (SST) may include an input voltage value of the high-voltage storage unit 111, a charging voltage value of a capacitor inside the high-voltage storage unit 111, and the like, and the current value may include an input current value of the high-voltage storage unit 111.

In addition, the resistance value may include a resistance value of a negative thermal coupler (NTC) or the like inside the high-voltage driving unit 112.

In addition, the voltage value in the semiconductor transformer (SST) may include an output voltage value of the low-voltage storage unit 131, a charging voltage value of a capacitor inside the low-voltage storage unit 131, and the like, and the current value may include an output current value of the low-voltage storage unit 131 and the like. In addition, the resistance value may include a resistance value of a negative thermal coupler (NTC) or the like inside the low-voltage driving unit 132.

In this manner, the semiconductor transformer (SST) according to the present invention may transmit the input/output voltage value and current value, the charging voltage value of the internal capacitor, the resistance value of the negative thermal coupler of the circuit for driving the internal transistor, and the like to the remote control device 200, and may transmit digital information obtained by converting a plurality of analog sensing values to the remote control device 200 with an asynchronous frame without using a voltage frequency converter (VFC), so that it is possible to efficiently transmit the digital information through one optical path without a separate synchronous signal.

As described above, in the power facility for remote control according to the present invention, by allowing a plurality of analog sensing values from the power facility to be transmitted to the remote control device by using one optical path, transmission efficiency can be increased, and by converting a plurality of analog sensing values of the power facility into digital information and transmitting the digital information with an asynchronous frame, the plurality of analog sensing values can be efficiently transmitted through one optical path without a separate synchronous signal.

The foregoing description includes examples of one or more embodiments.

While the present invention has been particularly illustrated and described with reference to exemplary embodiments thereof, it should be understood by the skilled in the art that the invention is not limited to the disclosed embodiments, but various modifications and applications not illustrated in the above description can be made without departing from the spirit of the invention. In addition, differences relating to the modifications and applications should be construed as being included within the scope of the invention as set forth in the appended claims.

In addition, differences relating to the modifications and applications should be construed as being included within the scope of the invention as set forth in the appended claims.

INDUSTRIAL APPLICABILITY

The present invention that transmits an internal analog value for monitoring of a power facility to a remote control device by using one optical path can be used in power facilities.

The invention claimed is:

1. A semiconductor transformer for remote control, comprising:

a high-voltage unit that converts an input low-frequency high-voltage AC into a high-frequency high-voltage AC voltage;

a step-down unit that converts the high-frequency high-voltage AC voltage into a high-frequency low-voltage AC voltage by stepping down the high-frequency high-voltage AC voltage;

a low-voltage unit that rectifies the high-frequency low-voltage AC voltage, charges the rectified low-voltage DC voltage, and outputs the rectified low-voltage DC voltage;

an analog sensing value reception unit that collects an internal analog sensing value of the semiconductor transformer;

a digital conversion unit that converts the analog sensing value into digital information; and a communication unit that transmits the digital information to an external remote control device by using one optical path, wherein the communication unit transmits the digital information with an asynchronous frame, wherein the asynchronous frame includes:

a preamble portion providing synchronous information;

a control operation portion providing control information;

a data portion providing the digital information; and a checksum portion checking an error during transmission of the frame.

2. The semiconductor transformer for remote control according to claim 1, wherein the analog sensing value is at least one of an internal voltage value, an internal current value, and an internal resistance value of a power facility.

3. The semiconductor transformer for remote control according to claim 1, wherein the high-voltage unit includes:

a high-voltage storage unit that converts the input low-frequency high-voltage AC into a high-voltage DC to charge the high-voltage DC;

an AC conversion unit that converts an output of the high-voltage storage unit into a high-frequency high-voltage AC;

a high-voltage driving unit that drives a transistor inside the high-voltage storage unit and the AC conversion unit; and a high-voltage communication unit that receives at least one analog sensing value among a voltage value, a current value, and a resistance value of the high-voltage storage unit and the high-voltage driving unit, converts the analog sensing value into the digital information, and performs the communication with the remote control device by using the digital information.

4. The semiconductor transformer for remote control according to claim 1, wherein the low-voltage unit includes:

a low-voltage storage unit that rectifies the input high-frequency low-voltage AC as an output of the step-down unit and charges and outputs a low-voltage DC;

a low-voltage driving unit that drives a transistor inside the low-voltage storage unit; and a low-voltage communication unit that receives an analog sensing value of at least one of an internal voltage value, an internal current value, and an internal resistance value of the low-voltage storage unit and the low-voltage driving unit, converts the analog sensing value into the digital information, and communicates with the remote control device.

5. The semiconductor transformer for remote control according to claim 3, wherein the voltage value includes an input voltage value of the high-voltage storage unit and a charging voltage value of a capacitor inside the high-voltage storage unit, wherein the current value includes an input current value of the high-voltage storage unit, and wherein the resistance value includes a resistance value of a negative thermal coupler (NTC) inside the high-voltage driving unit.

6. The semiconductor transformer for remote control according to claim 4, wherein the voltage value includes an output voltage value of the low-voltage storage unit and a charging voltage value of a capacitor inside the low-voltage storage unit, wherein the current value includes an output current value of the low-voltage storage unit, and wherein the resistance value includes a resistance value of a negative thermal coupler (NTC) inside the low-voltage driving unit.

* * * * *